Patented July 12, 1932

1,867,111

UNITED STATES PATENT OFFICE

HARRY L. SPENCE, OF RICHMOND, VIRGINIA, ASSIGNOR TO H. L. SPENCE COMPANY, A CORPORATION OF VIRGINIA

BRONZE FOR WELDING

No Drawing.   Application filed August 1, 1929.   Serial No. 382,852.

Heretofore all welding, as far as I know, with a bronze rod was done with an acetylene torch; this is an expensive method, and in a number of welding jobs in connection with railroad work such as tire, valve motion work, main rods, hub plate or liner, driving boxes, cross heads and tibs, this method has been prohibited by the Interstate Commerce Commission, and also by the railroads, because in welding with a torch it is claimed that it changes the structure of the metal, and causes it to break, and as no way to overcome this has been discovered, prior to my invention, thousands of dollars worth of worn locomotive and other parts were scrapped because the railroads did not want to weld with a steel rod on an electric welding machine, nor will they weld with an acetylene torch and a bronze rod.

The object of my invention is to provide a bronze that can be used in making an electric weld for parts and which can be deposited and welded in position to function as a bearing metal.

Experiments have been made with all of the commercial bronze on the market, but none of these have been found to be satisfactory for the purposes stated, and in further experiments I developed and perfected a bronze that will electrically weld to steel, cast steel, cast iron, or malleable iron, and will reweld to itself, and have further found by experiments, in actual railroad service, that this bronze electrically welded in position makes a very efficient bearing for frictional work on driving boxes, and all kinds of motion work on locomotives, and my improved bronze is now in commercial use on a large number of railroads.

I believe that I am the first to discover that a bronze can be used in the electrical welding of ferrous metals of the character described.

After the numerous experiments that I have made I have found that bronze rods for use on an electric welding machine of the following analysis gives good results, viz:

Copper, 80 to 96 percent, tin, 1 to 10 percent, phosphorous copper, .2 to 1 percent.

I have found that for some work the following analysis gives good results:

Copper, 95.4 percent, tin, 4.4 percent, phosphorus copper .2 to 1 percent, preferably 1 percent.

The proportions may be varied more or less, but I prefer the second composition given because I have found, that it gives the best results, and that the results are certain.

In use, a bronze rod embodying my invention is employed as an electrode which is disposed immediately above the article, and the bronze as fused is flowed in the open air onto the article to be welded, or on the bearing member, the bronze composition of which this rod is made obviating the necessity of carrying on the welding in a protective atmosphere or under a shield, or of employing the graphite arc process, or of using on the rod a non-oxidizing or other special coating, so that the invention provides a very simple, cheap and efficient welding process that can be worked in any shop without the use of expensive machinery. This composition has the advantage that a portion of its copper content, about four percent, unites with the ferrous metal, forming a bearing alloy which is integrally and separably bound to the ferrous part, but at the same time provides a soft but tough and durable deposit which is desirable for some kinds of work, such as main rods, valve motion parts and all thin work.

It will be understood that while I give an analysis in the claim, it will be understood that I preserve the right to vary the proportions given within permissible limits.

What I claim is:

1. As an article of manufacture, a welding rod for use as an electrode in electrically welding a bronze to steel, cast steel, cast iron, malleable iron and the like, consisting of copper 80 to 96 percent, tin 1 to 10 percent, and phosphorus copper .2 to 1 percent.

2. As an article of manufacture, a welding rod for use as an electrode in electrically welding a bronze to steel, cast steel, cast iron, malleable iron and the like, consisting of copper about 95.4 percent, tin about 4.4 percent, and phosphorus copper .2 to 1 percent.

3. The method of welding a bronze to steel, cast steel, cast iron, malleable iron and like ferrous metals so as to obtain an inseparable weld while preventing destructive changes in the ferrous metal, which consists in employing as a welding rod electrode an alloy consisting of copper, 80 to 96 percent, tin, 1 to 10 percent, and phosphorus copper, .2 to 1 percent, and electrically fusing and depositing the alloy metal of said rod upon the ferrous metal.

4. The method of welding a bronze to steel, cast steel, cast iron, malleable iron and like ferrous metals so as to obtain an inseparable weld while preventing destructive changes in the ferrous metal, which consists in employing as a welding rod electrode an alloy consisting of copper, about 95.4 percent, tin, about 4.4 percent, and phosphorus copper, .2 to 1 percent, and electrically fusing and depositing the alloy metal of said rod upon the ferrous metal.

In testimony whereof I affix my signature.

HARRY L. SPENCE.